Patented July 6, 1937

2,086,029

UNITED STATES PATENT OFFICE 2,086,029

NITRO-COMPOUND OF SUBSTITUTED BENZOTRIFLUORIDES AND PROCESS OF PREPARING THEM

Hans Heyna, Frankfort-on-the-Main-Hoechst, Germany, assignor to General Aniline Works, Inc., New York, N. Y., a corporation of Delaware No Drawing. Application December 30, 1935, Serial No. 56,789. In Germany January 3, 1935

3 Claims. (Cl. 260—142)

The present invention relates to nitro-compounds of substituted benzotrifluorides and to a process of preparing them; more particularly it relates to compounds of the following general formula

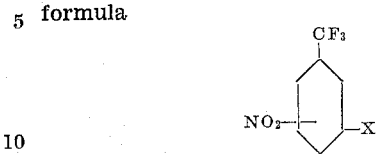

wherein X represents halogen and the nitro-group stands in one of the positions ortho and para to the $CF_3$-group.

According to Swarts (Bulletin de l'Academie Royal Belgique (3), 35, page 375 et seq.) the nitration of benzotrifluoride leads to meta-nitrobenzotrifluoride. Also the nitration of ortho- and para-chlorbenzotrifluoride or 2.4-dichloro-1-benzotrifluoride yields compounds which contain the nitro-group in meta-position to the $CF_3$-group (French Specification No. 745,293).

I have found that by nitrating compounds of the general formula

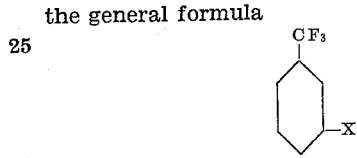

wherein X represents halogen, the nitro-group does not enter into the meta-position, but chiefly into the ortho-positions and to a small extent into the para-position to the $CF_3$-group. The invention leads to the manufacture of a great number of nitro-compounds of the trifluoromethyl series which were unknown, and of other nitro-compounds of this series which could be made only with great difficulty by another method. Thus, for instance, with nitration of meta-chlorobenzotrifluoride yields as main product the 3-chloro-6-nitro-1-benzotrifluoride.

The new nitro-compounds are capable of various reactions. They may be used for making new intermediate products and for the production of dyestuffs and pharmaceutical preparations.

The following examples serve to illustrate the invention, but they are not intended to limit it thereto; the parts are by weight.

(1) 902.5 parts of meta-chlorobenzotrifluoride (boiling point 136.5° C. to 137.5° C.) are slowly introduced at 0° C., while stirring, into a mixture of 1250 parts of nitric acid and 150 parts of concentrated sulfuric acid. When the introduction is finished, the whole is stirred at ordinary temperature and poured on 2000 parts of ice. The oil which separates consists, besides a small amount of 2-nitro- and 4-nitro-3-chloro-1-benzotrifluoride, of 6-nitro-3-chloro-1-benzotrifluoride and boils under a pressure of 4 to 5 mm. at 86° C. to 87° C. By cooling to a temperature of about 0° C. the 6-nitro-3-chloro-1-benzotrifluoride crystallizes in the form of prisms melting at 21° C. to 22° C.

By reducing the mixture of nitration, the corresponding mixture of bases is obtained, from which the hydrochloride of 6-amino-3-chloro-1-benzotrifluoride is isolated by dissolving in hydrochloric acid and salting out by means of sodium chloride.

(2) 902.5 parts of meta-chlorobenzotrifluoride are slowly introduced drop by drop, while stirring, at —5° C., into 750 parts of nitric acid of specific gravity 1.52. The whole is stirred at ordinary temperature and, after working up, a mixture of 6-nitro-3-chloro-1-benzotrifluoride and a small quantity of 2-nitro- and 4-nitro-3-chloro-1-benzotrifluoride is obtained, as indicated in Example 1.

By substituting in Examples (1) and (2) for the meta-chlorobenzotrifluoride, the meta-fluorobenzotrifluoride boiling at 98° C. to 101° C. there is obtained in an analogous manner a mixture of 2-nitro-4-nitro- and 6-nitro-3-fluoro-1-benzotrifluoride. From the mixture of nitration which forms an oil, there is obtained by freezing the pure 6-nitro-3-fluoro-1-benzotrifluoride boiling at 88° C. under a pressure of 12 mm.

I claim:

1. The process of preparing nitro-compounds of substituted benzotrifluorides which comprises nitrating a compound of the general formula

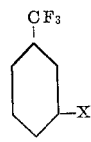

wherein X represents halogen.

2. The compounds of the following general formula
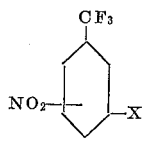
wherein X represents halogen and the nitro-group stands in one of the positions ortho and para to the CF₃-group, being partly solid, partly fluid compounds.
3. The compound of the following formula
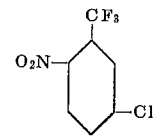
crystallizing in the form of prisms which melt at 21° C. to 22° C.
HANS HEYNA.